United States Patent
Aravabhumi et al.

(10) Patent No.: US 11,294,741 B1
(45) Date of Patent: Apr. 5, 2022

(54) SYSTEMS AND METHODS FOR CAPTURING AND REPORTING A TECHNICAL EVENT

(71) Applicant: STATE FARM MUTUAL AUTOMOBILE INSURANCE COMPANY, Bloomington, IL (US)

(72) Inventors: Kalpana Aravabhumi, Normal, IL (US); Leah Garcia, Hudson, IL (US); Michael Shawn Jacob, Le Roy, IL (US); Oscar Allan Arulfo, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 16/802,197

(22) Filed: Feb. 26, 2020

(51) Int. Cl.
*G06F 9/54* (2006.01)
*G06Q 30/00* (2012.01)
*G06F 9/451* (2018.01)

(52) U.S. Cl.
CPC .............. *G06F 9/542* (2013.01); *G06F 9/451* (2018.02); *G06Q 30/016* (2013.01)

(58) Field of Classification Search
CPC ........ G06F 9/542; G06F 9/451; G06Q 30/016
See application file for complete search history.

(56) References Cited

U.S. PATENT DOCUMENTS

| 10,185,611 | B2 | | 1/2019 | Hermany et al. |
| 10,979,765 | B2 * | | 4/2021 | Rege ................ H04N 21/44209 |
| 2002/0147858 | A1 * | 10/2002 | Motoyama .......... G06F 11/3495 |
| | | | | 719/318 |
| 2012/0246623 | A1 * | 9/2012 | Creel .................. G06F 11/3672 |
| | | | | 717/128 |
| 2017/0372231 | A1 | 12/2017 | Ghatage et al. |
| 2018/0285234 | A1 * | 10/2018 | Degaonkar ........... G06F 11/079 |
| 2019/0104014 | A1 * | 4/2019 | Margalit ............. G06F 11/3419 |

FOREIGN PATENT DOCUMENTS

| CN | 104932979 A | 9/2015 |
| CN | 109445973 | 3/2019 |

OTHER PUBLICATIONS www.instabug.com; archived Jan. 17, 2019; 19 pages (Year: 2019).*

(Continued)

*Primary Examiner* — Doon Y Chow
*Assistant Examiner* — Kimberly L Jordan
(74) *Attorney, Agent, or Firm* — Marshall, Gerstein & Borun LLP

(57) ABSTRACT

Systems and methods may facilitate acquisition, distribution, and analysis of information relating to technical events associated with client electronic computing devices within an organization (e.g., malfunctions and other performance issues of hardware and/or software). Graphical user interfaces may facilitate the acquisition of system state information associated with client devices, as well as the acquisition of other user-provided contextual information relating to technical events. Additionally, the systems and methods may facilitate acquisition, distribution, and analysis of information relating to organizational ideas raised by client device users within the organization.

17 Claims, 13 Drawing Sheets

(56) References Cited

OTHER PUBLICATIONS

Instabug—FAQ; https://web.archive.org/web/20190117130556/https://instabug.com/faq; archived Jan. 17, 2019; 3 pages (Year: 2019).*

Bugsee Inc, "Bug and crash reports by Bugsee," (2019). Retrieved from the Internet on Feb. 26, 2020 at: <URL: https://www.bugsee.com/>.

Instabug, Inc., "In-App Bug and Crash Reporting for Android Apps," (2020). Retrieved from the Internet on Feb. 26, 2020 at: <URL: https://instabug.com/platforms/android>.

Fullstory, "Using the "Report a bug" feature in FullStory," (2020). Retrieved from the Internet on Feb. 26, 2020 at: <URL: https://help.fullstory.com/hc/en-us/articles/360020624534-Using-the-Report-a-bug-feature-in-FullStory->.

\* cited by examiner

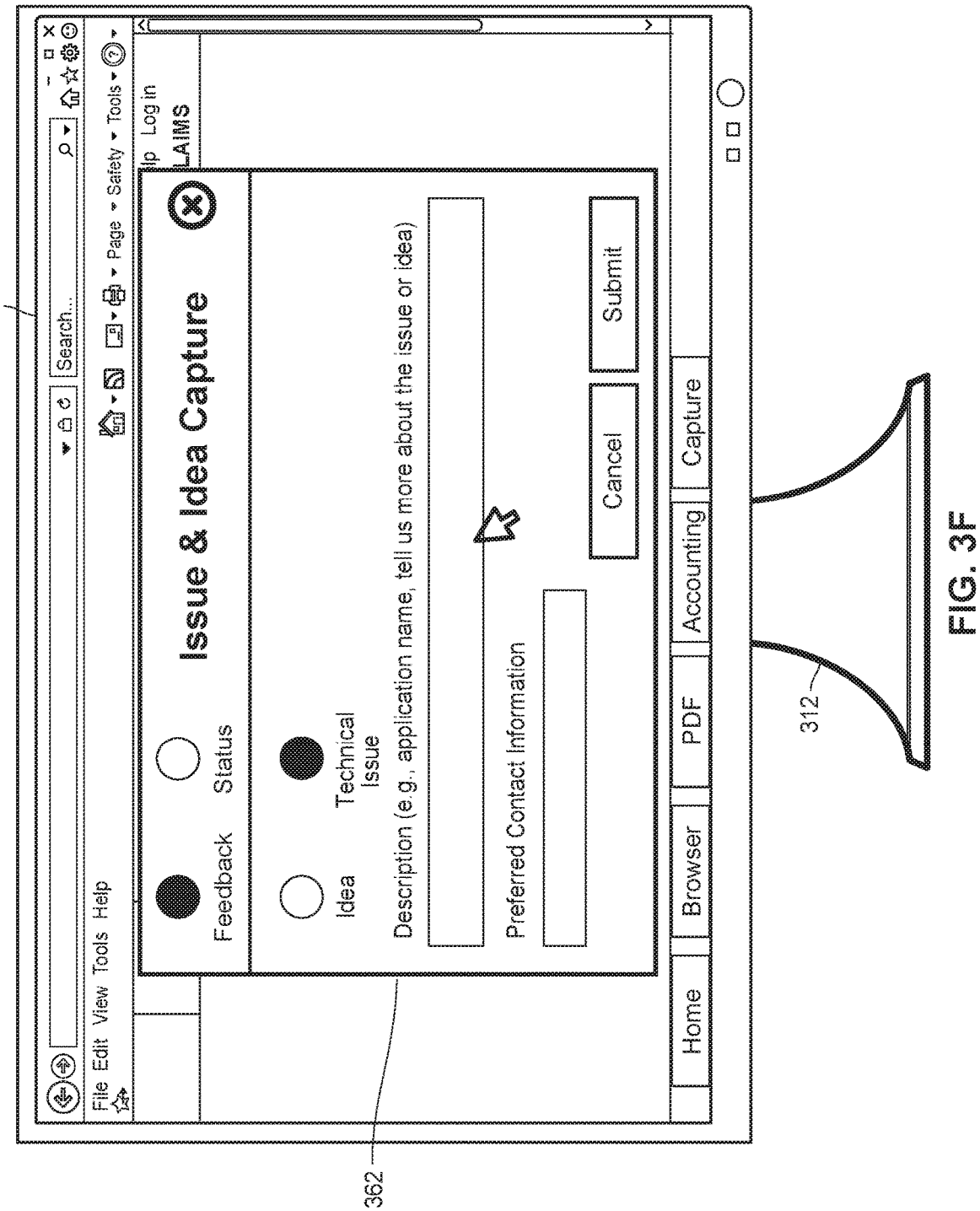

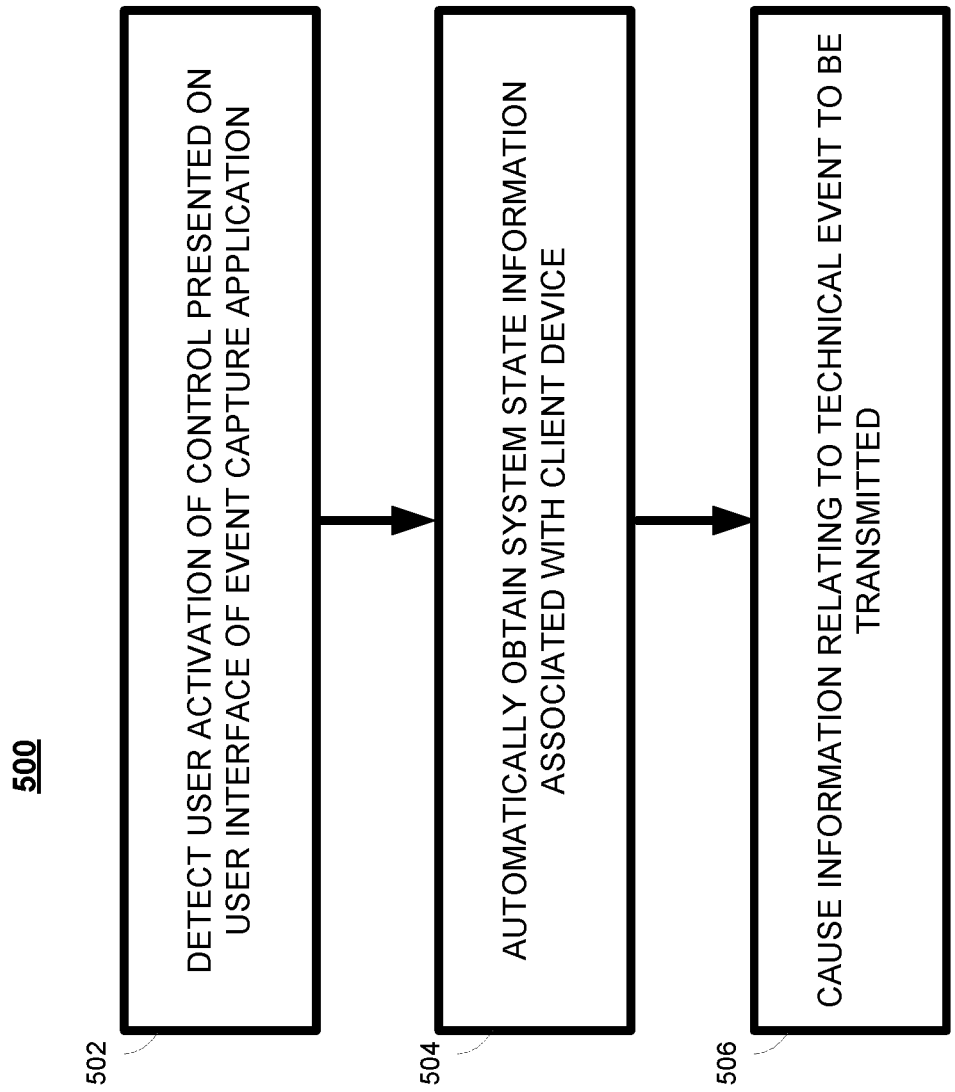

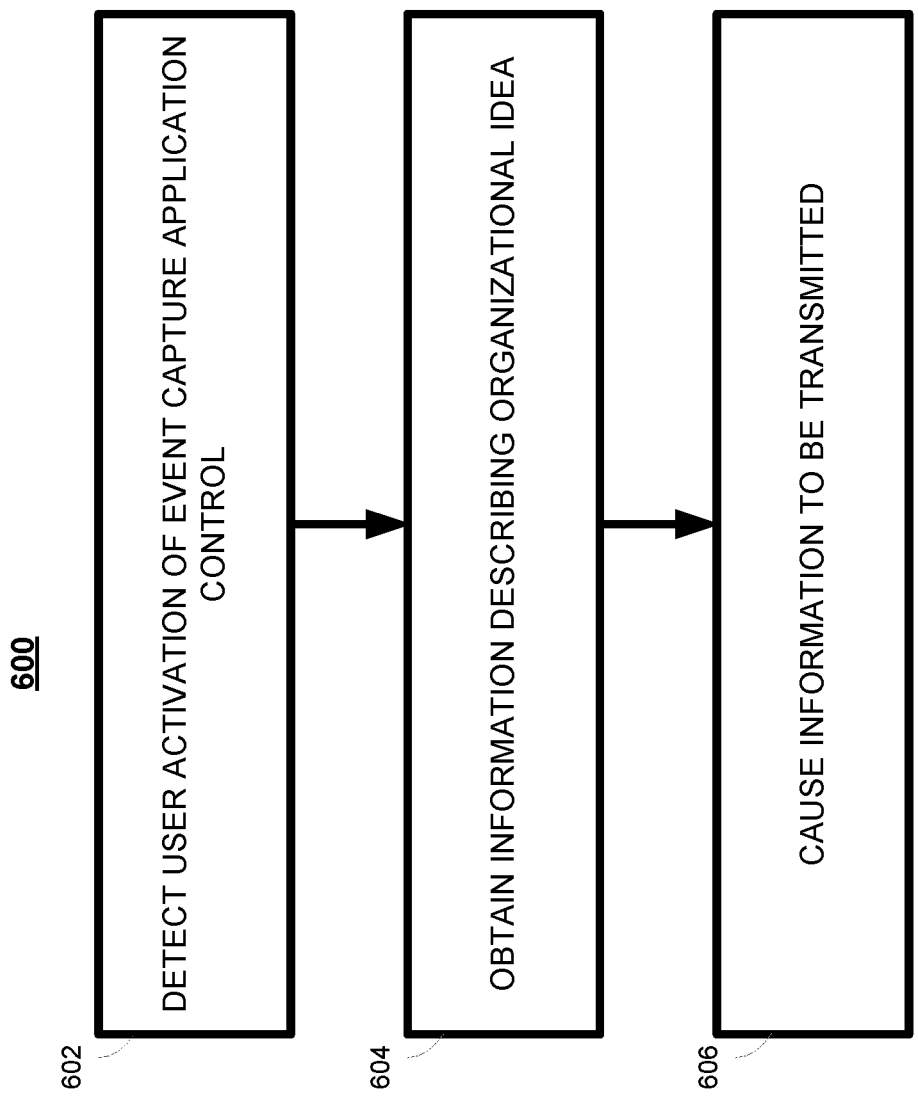

SYSTEMS AND METHODS FOR CAPTURING AND REPORTING A TECHNICAL EVENT

FIELD

The present disclosure generally relates to systems and methods for facilitating troubleshooting of client electronic computing devices and other computing devices in organizations, and more particularly, to techniques for automatic capture and routing of system state information and other information relating to software and/or hardware issues.

BACKGROUND

Many modern organizations, such as insurance companies, financial institutions, and other large enterprises, include a vast number of persons, computing devices, and software applications integral to the functions of the organization. The operations of an insurance company, for example, may include a number of insurance agents, business support staff, and technical support staff, each of whom may perform their roles via various client computing devices, including desktop computers, laptop computers, smartphones, tablets, etc. Performance of the organization's functions is often facilitated via various software applications, such as email applications, document creation and processing applications, web browser applications, and proprietary and/or third-party business applications. Accordingly, the organization also typically utilizes a number of network hardware devices (routers, modems, wireless access points, etc.), as well as servers that facilitate the functions of the aforementioned computing devices of the organization.

In organizations of such scale, it is expected that persons within the organization will encounter a variety of issues relating to hardware and/or software used by the organization. As an example, an insurance agent may experience a hardware malfunction of their desktop or laptop computer, or a bug in a software application. As another example, a malfunction of one or more servers or network devices (or inefficient performance thereof) may interfere with operation of essential applications relied upon by a number of persons within the organization. Significant resources are saved within the organization when such issues are identified, diagnosed, and resolved quickly and effectively. However, in organizations of scale, inefficiencies are introduced in the acquisition of information relating to hardware/software malfunctions, as well as in the identification and resolution of root causes of such malfunctions. For example, such malfunctions may typically be reported en masse to technical support staff with the expectation that the technical support staff can identify and resolve the root causes of all malfunctions. However, information included in a report of a malfunction can often be insufficient for identifying a root cause, and any further information of potential relevance (e.g., information reflecting characteristics of a user's computer at the time of a malfunction) may not be obtainable after-the-fact. Moreover, the technical expertise of support staff may vary, and thus not all technical support staff may be equally suited to identify and/or resolve the wide array of hardware/software malfunctions that might be encountered in the organization.

Analogous problems are encountered when a person within the organization seeks to contribute an idea that may be useful in improving the functions or performance of software, hardware, workflows and/or other aspects of the organization. That is, particularly in a large organization, existing techniques may be insufficient for a person to fully provide such information in a timely manner, and the staff of the organization responsible for receiving and handling such information may not be equally prepared to do so when information is reported en masse.

Accordingly, there is a need for improved computing systems and methods capable of acquiring, distributing, and analyzing information relating to a technical events associated with client computing devices in an organization (e.g., hardware and/or software malfunctions), as well as ideas raised by persons within the organization.

SUMMARY

The present application discloses techniques by which information relating to technical events associated with client electronic computing devices (e.g., hardware and/or software malfunctions or performance inefficiencies originating at a client device or elsewhere in an organizational computing system) may be automatically acquired, distributed, and analyzed to facilitate proper diagnosis and resolution of technical events. Additionally, the present application discloses techniques by which information relating to ideas raised by persons within the organization may be acquired, distributed, and otherwise handled.

An event capture application, which may run in the background at client devices, may provide non-invasive, user-friendly controls that allow for automatic capture of system state information associated with client devices, as well as the acquisition of verbal user feedback, text feedback, and/or other information provided by client device users. Back-end computing entities (e.g., servers) may employ techniques that allow for information reported by client devices to be intelligently analyzed, classified, and distributed to additional organizational entities (e.g., particular servers and/or technical staff) best equipped to handle particular technical events. Similar techniques may be applied for capture of ideas relating to organizations, whereby an application (e.g., the event capture application) may receive and transmit user-provided information describing an idea, and whereby back-end computing entities may analyze and route the transmitted information to facilitate handling of ideas emerging within the organization.

In an embodiment, a computer-implemented method may be provided for acquiring information relating to a technical event associated with a client computing device. The method may include (1) detecting, by an event capture application being executed by one or more processors of the client computing device, a user activation of a control presented on a user interface of the client computing device, the user activation of the control indicating an occurrence of a technical event associated with the client computing device, (2) automatically obtaining, by the event capture application and in response to detecting the user activation, system state information associated with the client computing device, and/or (3) causing, by the event capture application, information relating to the technical event to be transmitted to one or more other computing entities, the information associated with the technical event including the obtained system state information. The computer-implemented method may include additional, fewer, and/or alternate actions, including actions described herein.

In another embodiment, a client computing device may be configured to acquire information relating to a technical event associated with the client computing device. The client computing device may include (1) one or more processors, and (2) one or more non-transitory computer memories storing non-transitory computer-executable instructions that, when executed by the one or more processors, cause the client computing device to (i) detect, by an event capture application being executed by the one or more processors, a user activation of a control presented on a user interface of the client computing device, the user activation of the control indicating an occurrence of a technical event associated with the client computing device, (ii) automatically obtain, by the event capture application and in response to detecting the user activation, system state information associated with the client computing device, and/or (iii) cause, by the event capture application, information relating to the technical event to be transmitted to one or more other computing entities, the information associated with the technical event including the obtained system state information. The client computing device may include additional, fewer, and/or alternate computing components including components described herein, and may be configured to perform additional, fewer, and/or alternate actions, including those described herein.

In yet another embodiment, one or more non-transitory computer-readable media may store non-transitory computer-executable instructions that, when executed by one or more processors, cause a client computing device to (1) detect, by an event capture application being executed by the one or more processors of the client computing device, a user activation of a control presented on a user interface of the client computing device, the user activation of the control indicating an occurrence of a technical event associated with the client computing device, (2) automatically obtain, by the event capture application and in response to detecting the user activation, system state information associated with the client computing device, and/or (3) cause, by the event capture application, information relating to the technical event to be transmitted to one or more other computing entities, the information associated with the technical event including the obtained system state information. The one or more non-transitory computer-readable media may store additional, fewer, and/or alternate instructions, including those described herein.

BRIEF DESCRIPTION OF THE DRAWINGS

The figures described below depict various aspects of the applications, methods, and systems disclosed herein. It should be understood that each figure depicts an embodiment of one or more particular aspects of the disclosed applications, systems and methods, and that each of the figures is intended to accord with one or more possible embodiments thereof. Furthermore, wherever possible, the following description refers to the reference numerals included in the following figures, in which identical or functionally similar elements are depicted with like reference numerals.

FIGS. 3A-3G illustrate example graphical user interfaces of an event capture application operating at a client electronic computing device, in accordance with some embodiments;

FIG. 5 illustrates a flow diagram of an example computer-implemented method, in accordance with some embodiments; and FIG. 6 illustrates a flow diagram of another example computer-implemented method, in accordance with some embodiments.

DETAILED DESCRIPTION

Figure 1:
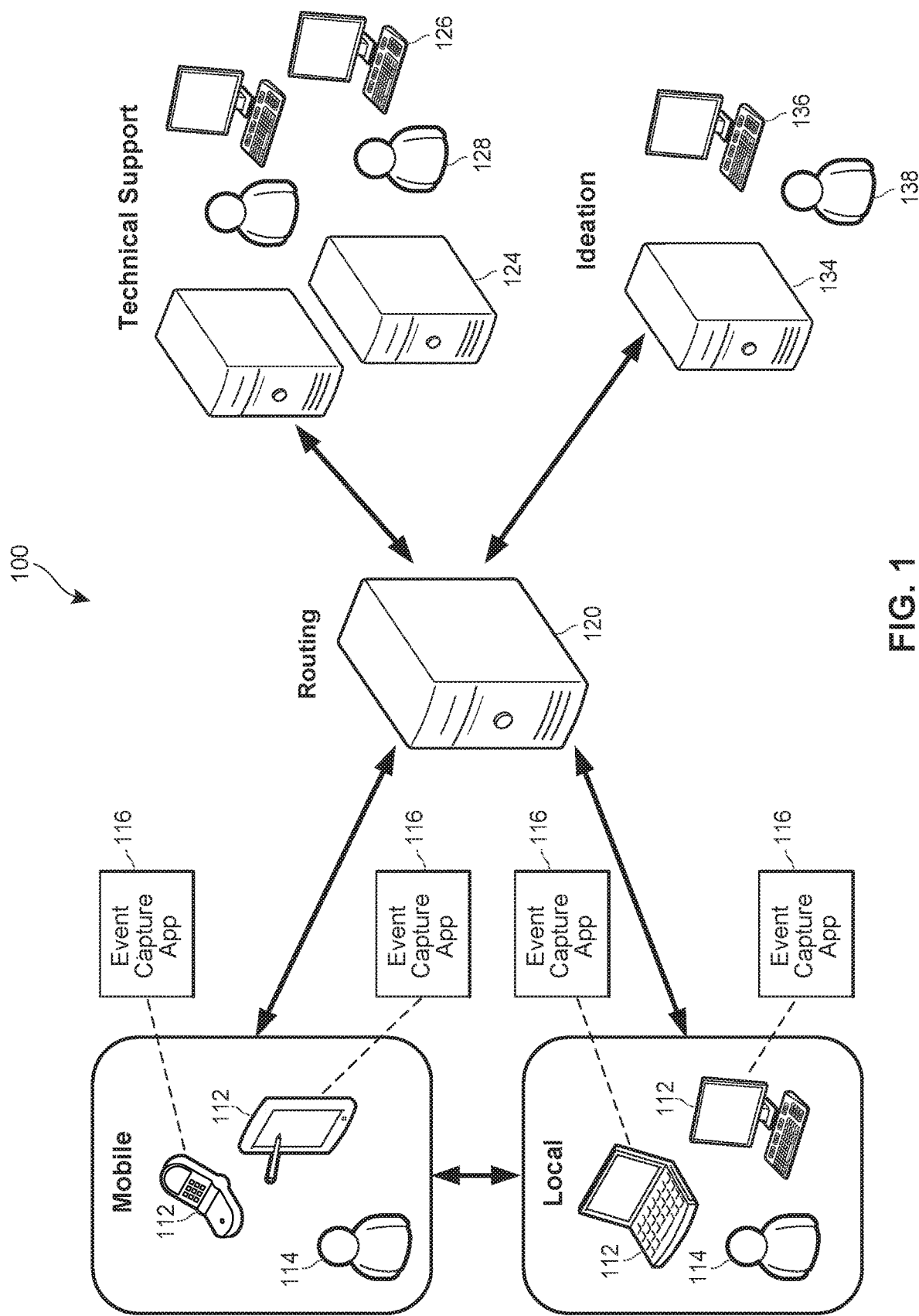
FIG. 1 illustrates an example computing environment in which techniques of this disclosure may be implemented, in accordance with some embodiments.

The systems and methods described herein, at a high level, provide for automatic capture of information relating to technical events at client electronic computing devices ("client devices," e.g., smartphones, laptop computers, desktops, etc.). The systems and methods described herein may facilitate diagnosis, routing, and/or resolution of various technical events occurring in a computing system of an organization (e.g., at client devices and/or other computing entities in an insurance company or financial institution). Technical events addressed by these systems and methods may include, for example, malfunctions or performance inefficiencies originating from hardware and/or software of client computing devices, and/or originating from elsewhere in (or even external to) the computing system of an organization (e.g., malfunctions of servers or network equipment, which may affect operations of client computing devices).

A software application, referred to herein as an "event capture application," may facilitate capture and transmission of information relating to a technical event associated with a client device. The event capture application may be configured to operate in the "background" of the client device, allowing the event capture application to operate even while a user of the client device operates other applications. This allows for quick and responsive activation of the event capture application when needed, and also allows for background operations to continually monitor at least some system state information of the client device. Upon detecting that a technical event has occurred (e.g., upon detecting activation of a user interface control provided by the event capture application), the event capture application may automatically obtain system state information associated with the client device, and further may present various additional user interfaces to facilitate obtaining additional information, as will be described herein.

Obtained system state information may include, for example, information pertaining to usage of software applications of the client device, performance of memory or processing devices of the client device, network usage by the client device, and/or other aspects of operation of the client device, at and/or leading up to (and possibly also after) a time at which the occurrence of the technical event is detected. In some embodiments, obtained system state information may include information pertaining to various other computing devices in the larger computing system of the organization in which the client device operates (e.g., indicating operation of servers and/or network equipment interconnecting the various other computing devices in the larger computing system of the organization), and possibly even information obtained from external sources (e.g., relating to an external network that is communicatively coupled to the organization's computing system, if such information is made available).

Further functionalities of the event capture application may allow the client device user to provide further contextual information relating to the technical event. Such functionalities may include obtaining audio, text, and/or video from the client device user, in which the user describes the technical event as experienced by him or her (e.g., describing the behavior of a software application at the client device and/or how performance thereof was inhibited).

Upon capture of system state information and/or other contextual information relating to the technical event, the event capture application may automatically cause the obtained system state information and/or contextual information to be transmitted to one or more other computing entities (e.g., "back-end" servers in the organizational computing system configured to route and/or analyze technical events). The one or more other computing entities, upon receiving the transmitted information relating to the technical event, may intelligently analyze and/or route information relating to particular technical events to particular computing entities and/or organizational staff capable of diagnosing and/or resolving particular technical events. Intelligent operations of the one or more other computing entities may include various analyses of the information relating to the technical event (e.g., sentiment analysis of user-provided contextual information, and/or machine learning methods for automatically diagnosing and/or resolving technical events based upon training data indicative of causes and/or successful remediation of past technical events).

In some embodiments, the systems and methods described herein may instead (or also) facilitate capture of information relating to ideas raised by persons within the organization (e.g., improvements to software, hardware, and/or business processes used by the organization). In these embodiments, the event capture application or another application executing at the client device may facilitate capture of user-provided information describing an idea conceived of (or forwarded) by the user of the client device (e.g., audio, video, and/or text). Obtained information relating to an organizational idea may be automatically transmitted to the one or more other computing entities, which may similarly analyze and/or route the obtained information to appropriate computing entities and/or staff, thereby providing quicker, more efficient handling of ideas emerging within the organization.

As will be described herein, the described systems and methods provide a number of technical benefits. For example, systems and methods described herein improve the acquisition and distribution of information relating to technical events occurring across a potentially large number of computing devices in an organization. Furthermore, the systems and methods described herein may improve the function of client devices (e.g., client device hardware and/or software), and/or larger organizational computing systems by facilitating the identification/diagnosis and resolution of software and/or hardware issues particular to the client devices and/or larger computing systems. Moreover, the event capture application as described herein provides improvements upon traditional techniques for recording software and/or hardware issues, such as by the background operations of the event capture application obtaining system state information prior to a time at which a technical event is detected (e.g., by continually obtaining and storing a "rolling window" of system state information corresponding to a duration of time prior to any given current time).

Example Computing Environment

FIG. 1 illustrates a block diagram of an example computing environment 100 via which techniques described herein may be implemented. At a high level, the computing environment 100 includes a number of "front-end" client electronic computing devices 112, each of which may be operated by one or more users 114 (e.g., persons within an organization). Users 114 may use respective client devices 112 to access a number of software applications executing by the client devices 112, the applications being configured to facilitate various operations of an organization (e.g., email application, web browser application, business software application(s), document creation/processing applications, other proprietary applications, etc.).

The client devices 112 may include various electronic devices that may be utilized in an organization, such as smartphones, tablets, laptop computers, desktop computers, wearable electronic devices, and/or other suitable computing devices. The client devices 112 as described herein may include a combination of "local" client devices (e.g., physically located and/or fixedly connected within a local premises of an organization) and "mobile" client devices (e.g., physically carried within the premises by users 114, and/or remotely connected to the organizational network from outside of the organization's base of operations).

An event capture application 116 ("Event Capture App"), with independent instances executing at each of one or more of the client devices 112, may operate to detect technical events associated with the respective client devices 112, and automatically obtain system state information and/or further contextual information associated with the respective client devices 112. The event capture application 116, as will be described in more detail herein, may cause the obtained information relating to technical events to be transmitted to other "back-end" computing entities configured to handle the information relating to technical events. Such back-end computing entities may include one or more routing servers 120, which may intelligently analyze the obtained information and responsively route the information to still other computing entities and/or staff in an organization. Accordingly, the back-end computing entities may further include one or more technical support servers 124, and/or one or more technical support workstations 126 operated by one or more technical staff 128, which may collectively function to diagnose and/or resolve technical events relayed by the routing server(s) 120. In some embodiments, respective ones of the technical support servers 124, workstations 126, and/or staff 128 may be designated for diagnosing and/or resolving particular types or categories of technical malfunctions, such as events relating to particular software applications and/or hardware components or particular other technical events (e.g., particular operational inefficiencies such as slow application loading times or slow query response times). Additionally or alternatively, back-end computing entities may include ideation servers 134 and/or ideation workstations 136 operated by one or more ideation staff 138, which may collectively function to handle information relating to organizational ideas routed by the routing server(s) 120.

Communications among computing entities in the environment 100, as represented via bidirectional arrows, may be implemented via one or more suitable computing networks. Such one or more networks may include, for example, a local area network (LAN) and/or a wireless LAN (WLAN) implemented by an organization. Additionally or alternatively, the one or more networks may include one or more wide-area networks (WAN) implemented via the Internet and/or a cellular communications network. Combinations of computing networks may be utilized, in various embodiments. Accordingly, the environment 100 may include various additional computing hardware and/or software that may operate to implement communications among other computing entities in the environment 100 (e.g., routers, modems, network cables, firewalls, servers, etc.).

A server, when referred to herein (e.g., server 120, 124, and/or 134) may include one or more distinct servers (e.g., distributed servers in a server farm). A server as described herein may generally include a memory (i.e., one or more memories), which may include ROM, RAM, and/or other suitable types of computer memory. Non-transitory computer memory of a server may include computer-executable instructions to be executed by a processor of the server (i.e., one or more processors of the server) to perform operations thereof, as described herein.

The environment 100 may include more, fewer, and/or different computing entities than are depicted in FIG. 1, in various embodiments.

Figure 2:
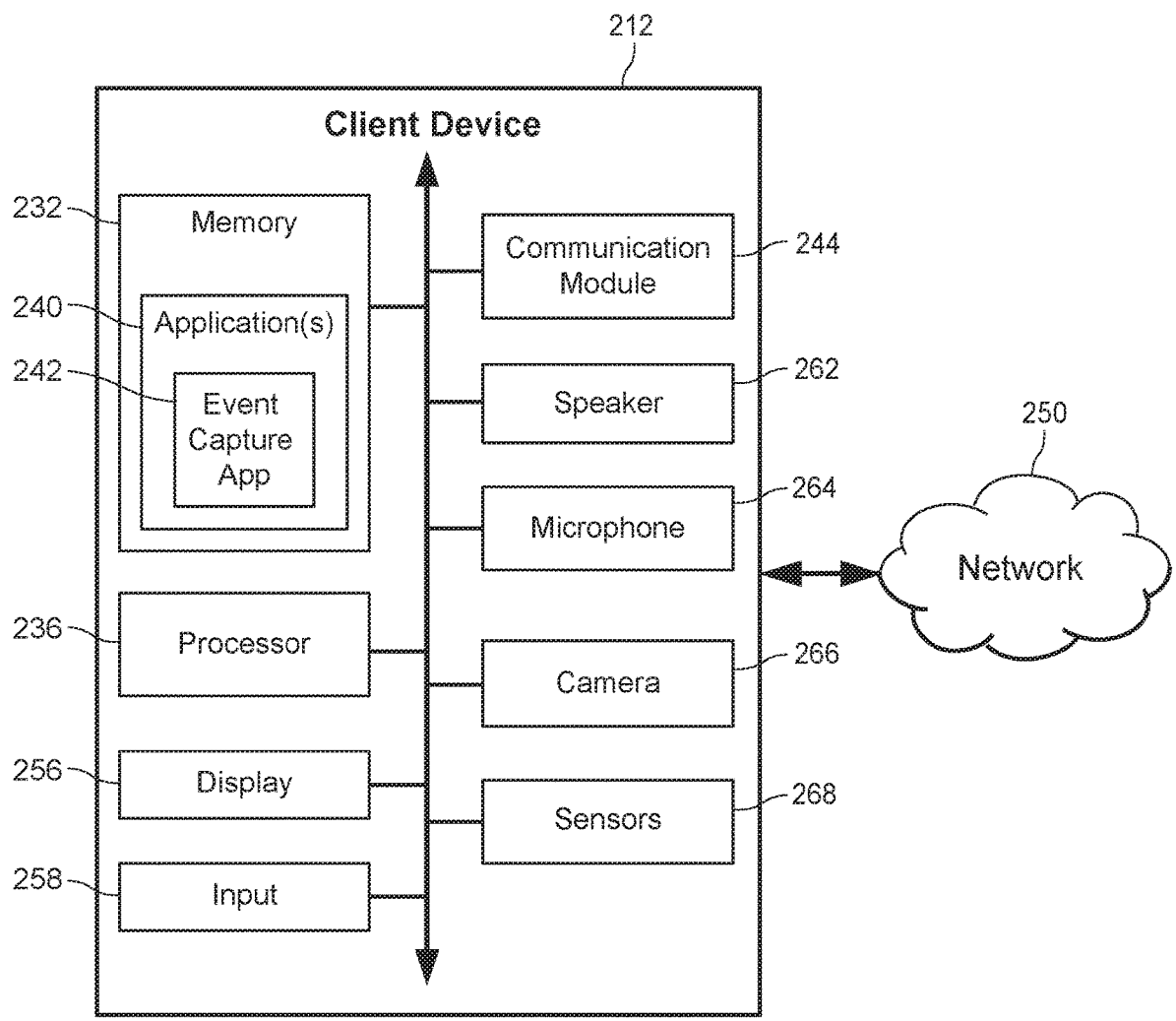
FIG. 2 illustrates a block diagram of an example client electronic computing device that may operate in the computing environment of FIG. 1, in accordance with some embodiments.

FIG. 2 illustrates a block diagram of an example client electronic computing device 212 ("client device"), which may correspond to one or more of the client devices 112 depicted in FIG. 1. At a high level, an event capture application executed by the client device 212 may detect a technical event associated with the client device 212 (e.g., originating at the client device 212 or otherwise affecting performance at the client device 212), and may, automatically and in response to detecting the technical event (i.e., detecting user activation of a user interface control that indicates such an event), obtain and transmit system state information and/or user-provided contextual information associated with the technical event. Additionally or alternatively, in some embodiments, the client device 212 may obtain information relating to an organizational idea raised by a user of the client device 212. The client device 212 may include more, fewer, and/or different components than are described herein, in various embodiments.

A technical event associated with the client device 212 may include, for example, a malfunction of hardware and/or software associated with the client device 212. As another example, a technical event associated with the client device 212 may include performance inefficiency of hardware and/or software associated with the client device (e.g., excessive load times or start up times). A technical event that is "associated with" the client device 212 may be an event that originated at the client device 212 itself (e.g., a failure caused by the device's internal hardware or software), or an event that originated elsewhere but still affects performance at the client device 212 (e.g., a malfunction of a server relied upon by a software application that operates at the client device 212). Because root causes of technical events may be distributed among a client device 212 and other devices with which the client device 212 communicates, and because root causes of technical may be unknown at the time at which events are detected, it follows that the event capture application executed by the client device 212 may function to detect not only those technical events that are caused by problems at the client device 212, but also those technical events that are caused by other devices or systems, but nonetheless impact operation of the client device 212.

The client device 212 may include one or more computer memories 232, which may include one or more non-transitory memories (e.g., ROM) and/or one or more volatile memories (e.g., RAM). The memory 232 may store non-transitory computer-executable instructions that are executable via a processor 236 (i.e., one or more processors, e.g., CPU, GPU, and/or other suitable processing units) to perform the actions of the client device 212 described herein. In particular, the one or more computer memories 232 may store one or more applications 240, including for example an email application, a document creation/processing application, a web browser application, one or more proprietary or third-party business-related applications. Of particular note, the one or more applications 240 include an event capture application 242 ("Event Capture App") as described herein. Each application 240 may include one or more sets of non-transitory computer-executable instructions that, when executed by the processor 236, cause the client device 212 to perform operations associated with the application 240 (e.g., operations involving the processor 236, communications module 244, and/or other suitable components of the client device 212).

The client device 212 may include a display device 256 (i.e., one or more display devices, such as a monitor) and an input device (i.e., one or more user input devices, e.g., a keyboard, a mouse, etc.). In some embodiments, at least some of devices 256 and 258 are integrated (e.g., as a touchscreen with both touch input and display capability). The display device 256 and/or user input device 258 of the client device 212 may be physically included within the client device 212 (e.g., a fixedly installed touchscreen), or may be operatively coupled with the client device 212 by other means (e.g., a mouse, keyboard, or peripheral touchpad connected to the client device 212 by wired or wireless means).

The client device 212 may include a speaker 262, a microphone 264, a camera 266, and/or one or more other sensing components 268 (also referred to herein as "sensors"), such as a positioning unit (e.g., GPS), an accelerometer, a gyroscope, etc. The speaker 262, microphone 264, camera 266, and/or sensors 268 may be physically included within the client device 212 (e.g., a natively installed camera or speaker), and/or may be operatively coupled with the client device 212 by other means (e.g., a peripheral camera, speaker, or microphone connected to the client device 212 by wired and/or wireless means).

Collectively, the display device 256, input device 258, speaker 262, microphone 264, camera 266, and/or sensors 268 may provide one or more user interfaces of the client device 212. For example, the display device 256 may display/present one or more graphical user interfaces, which may include interactive controls that the user can activate via the input device 258 to cause functionalities described herein to be performed (e.g., via a touchscreen tap or swipe, a mouse click, a keyboard stroke, etc.). Additionally or alternatively, in some embodiments, similar user interfaces may be provided by the speaker 262, microphone 264, camera 266, and/or sensors 268 (e.g., an interactive audio interface or a gesture-based user interface).

In some embodiments, the user of the client device 212 may "opt-in" to particular data collection functionalities utilizing the microphone 264, camera 266, and/or other sensors 268. For example, the user may opt-in to permit capture of audio and/or video input (e.g., speech and/or gestures) by which the user describes a technical event associated with the client device 212. In some embodiments, the event capture application 242 may be permitted to capture other sensor information indicative of the event at the client device 212. The event capture application 242 may, for example, obtain information relating to position, movement, and/or acceleration of the client device 212, which may indicate a location or other activity of the client device 212 and/or activity of the user at or before a time at which the technical event was detected.

The event capture application 242 operating by the client device 212 may be a desktop application, a smart device application (e.g., a "mobile app"), a browser application, or some combination of the above. System state information associated with the client device 212 (and obtained by the event capture application 242) may include, for example, information relating to usage of the memory 232, processor 236, applications 240, display device 256, input device 258, communication module 244, and/or other components of the client device 212 (or particular portions thereof) at and/or leading up to (and possibly also after) a time at which the occurrence of a technical event is detected. Additional examples of system state information obtained by the event capture application 242 are provided with respect to FIGS. 4A and 4B.

In some embodiments, the event capture application 242 may operate as a "background" application at the client device 212. A background application, as referred to herein, is an application that performs at least some operations intermittently or continually without requiring display of a user interface occupying a substantial portion of a visual display of the client device 212, and without otherwise requiring enough computing resources (e.g., RAM and processing power) to substantially delay or interrupt the user's operation of other applications via the client device 212. In some cases, the background application may, upon launching (e.g., automatically at startup of the client device 212 and/or upon the user manually causing the application to be launched subsequent to startup), continue to run in the background while the client device 212 remains powered on, i.e., until either the client device 212 is powered off or the user manually causes the background operations to cease.

Background operations of the event capture application 242 at the client device 212 may include continually obtaining and storing at least some system state information of the client device 212. The event capture application 242 may, for example, continually obtain and overwrite a log of stored system state information in a "rolling window" manner, where the window consists of a predetermined amount of time prior to any given current time (e.g., one, five, fifteen, thirty, or sixty minutes prior to the current time). In some embodiments, the event capture application 242 may, while operating in the background, detect that a technical event has occurred. The event capture application 242 may, for example, detect a user's activation of a control presented on a graphical user interface of the event capture application 242, where the event capture application 242 causes the client device to display the control while the event capture application 242 operates in the background.

In response to detecting the technical event, the event capture application 242 may (1) automatically obtain system state information (e.g., obtain current system state information and/or the monitored system state information), and/or (2) provide additional graphical user interfaces to the user (e.g., to invoke the event capture application 242 to appear in the "foreground" to enable user entry of contextual information). Examples of graphical user interfaces in the event capture application 242 will be described below with respect to FIGS. 3A-3G. In some embodiments, upon obtaining information relating to the technical event (e.g., upon completion of transmission of relevant information to one or more other computing entities), the event capture application 242 may continue to operating in the background at the client device 212.

Via these techniques, the event capture application 242 may facilitate thorough capture of technical events in a manner that does not require the creation of dedicated, scenario-specific scripts (e.g., by IT staff), or a continual, substantial demand of computing resources that would impede the user of the client device 212 from using other ones of applications 240. Additionally, the monitoring of system state information in the background facilitates comprehensive acquisition of information relating to technical events, particularly those technical events for which there is a delay between the occurrence of a root cause of the technical event and the time at which the technical event is detected. Furthermore, the event capture application 242 may ensure that necessary system state information is obtained while allowing the user to provide additional contextual information regarding the technical event at a later time, such that the user need only take a very brief pause from his or her other computing activities (e.g., the activities that the user was performing at the time he or she noticed the technical event).

Example Graphical User Interfaces of an Event Capture Application

FIGS. 3A-3G depict example graphical user interfaces that may be displayed by a display screen 310 of a client device 312, for example by an event capture application executed by the client device 312. The graphical user interfaces of FIGS. 3A-3G include various interactive controls by which a user of the client device 312 may provide an indication that a technical event occurred, which may in turn cause automatic capture of system state information and provide an opportunity for the user to provide additional contextual information (e.g., text, audio, video, etc.) relating to the technical event.

Furthermore, although a desktop computer is portrayed in FIGS. 3A-3G, it should be understood that the client device 312 may be any suitable client device, including those discussed with respect to FIGS. 1 and 2 (client devices 112 and/or 212). Accordingly, the display screen 310 may be, for example, the display device 256 as described with respect to FIG. 2, and user interaction with controls included in the displayed graphical user interfaces may be received via an input 258, microphone 264, camera 266, and/or sensors 268. The event capture application may be, for example, the event capture application 116 or 242 as described with respect to FIGS. 1 and 2, respectively. Although discussion of the client device 312 will focus on the display screen 310, it should be appreciated that the client device 312 may include various additional computing components, including those described herein.

Figure 3A:
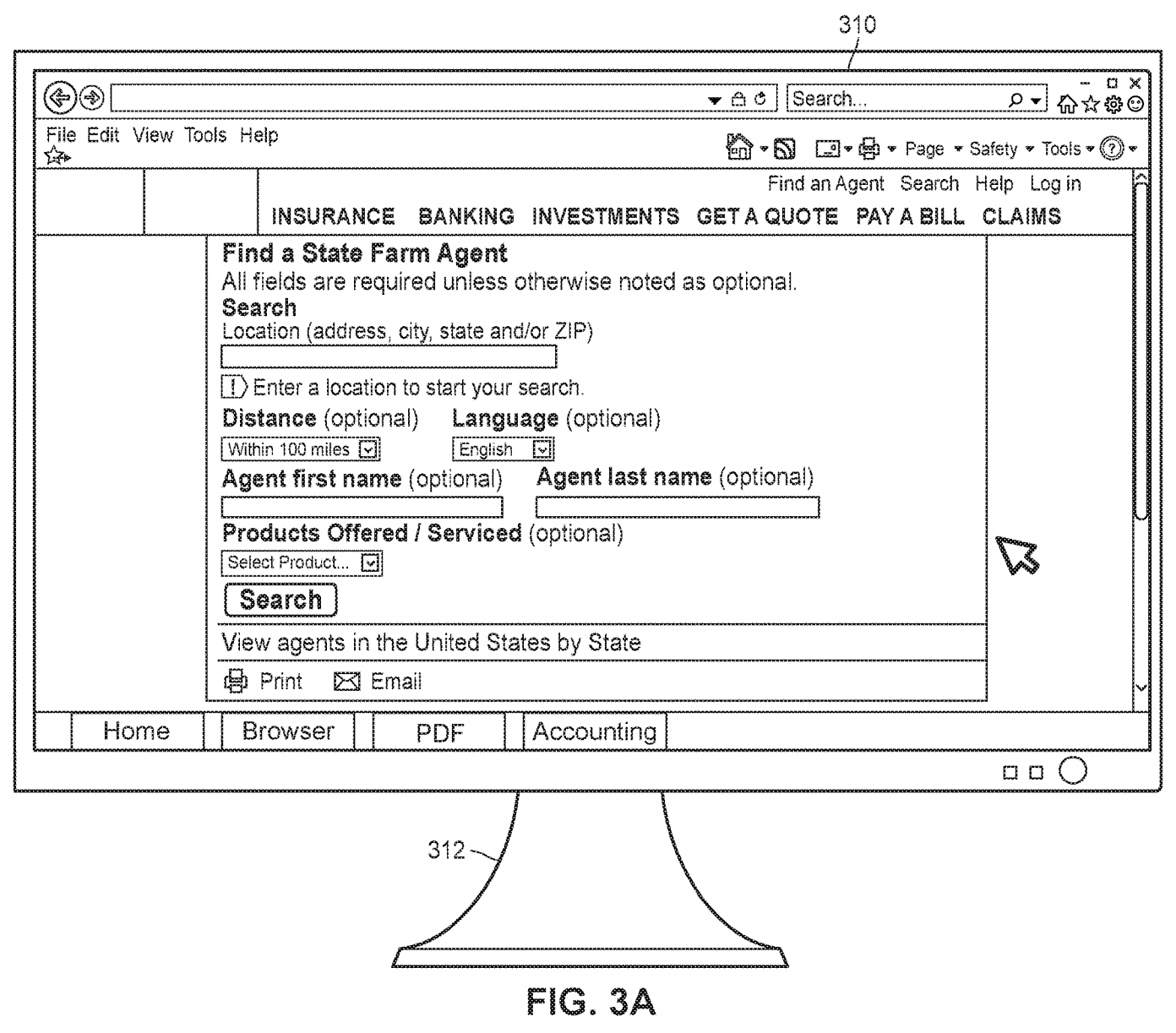

Turning first to FIG. 3A, the event capture application does not display a graphical user interface on the display screen 310, in this embodiment, even though the event capture application may be executing via the client device 312 (e.g., in the background). Thus, the user of the client device 312 may freely operate other applications (e.g., a browser and/or other applications shown in a task bar at the bottom of the display screen 310). The event capture application, while operating in the background, may continually obtain and store at least some system state information associated with the client device 312 (e.g., a rolling window of CPU, memory, and/or application usage or performance, etc.). Additionally or alternatively, the event capture application operating in the background may listen for signals from hardware and/or software of the client device 312 and/or other computing entities in an organizational computing system, which may be indicative of malfunctions, inefficiencies, and/or other technical events.

Figure 3B:
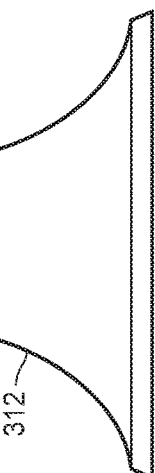

FIG. 3B depicts in an embodiment and/or scenario in which an additional graphical user interface 322, generated by the event capture application, is presented on the display screen 310. As shown in FIG. 3B, the graphical user interface 322 is small in size, and is displayed at the top of the display screen 310. In some embodiments, the graphical user interface 322 may additionally or alternatively include an icon on the task bar at the bottom of the screen 310 (e.g., at the right end of the task bar, which may include other commonly displayed icons indicative of battery charge level, sound level, network connectivity, date and time, etc.).

In some embodiments, the event capture application may cause the relatively small graphical user interface 322 to be displayed upon receiving a user interaction corresponding to a particular area of the display screen 310, such as moving or hovering the mouse near the (eventual) location of the graphical user interface 322, or providing a tap or swipe over the location of the graphical user interface 322, and may cause the graphical user interface 322 to disappear from the display screen 310 in response to subsequent user interaction (e.g., when the user moves the mouse away from the graphical user interface 322 or provides a touchscreen interaction elsewhere on the display screen 310). Alternatively, in some embodiments, the event capture application may cause the graphical user interface 322 to be continuously displayed, thereby indicating that the event capture application is operating in the background, while still not substantially interfering with other user interaction with the client device 312.

In some embodiments, at least a portion of the graphical user interface 322 may correspond to a control by which the user of the client device 312 can cause additional graphical user interface elements to be displayed by the display screen 310. For example, in some embodiments, a mouse click or tap of the graphical user interface 322 may cause display of one or more of the graphical user interfaces as will be discussed with respect to FIGS. 3C and 3D.

As will be understood from subsequent figures, the graphical user interface 322 of FIG. 3B makes functionalities of the event capture application readily available while the event capture application is operating in the background, without requiring substantial occupation of the display screen 310 of the client device 312 and without otherwise substantially interfering with operations of the client device 312. In various embodiments, for example, the graphical user interface 322 may occupy less than 5% of the display screen 310, less than 2%, less than 1%, etc. (e.g., when default display settings are applied).

Figure 3C:
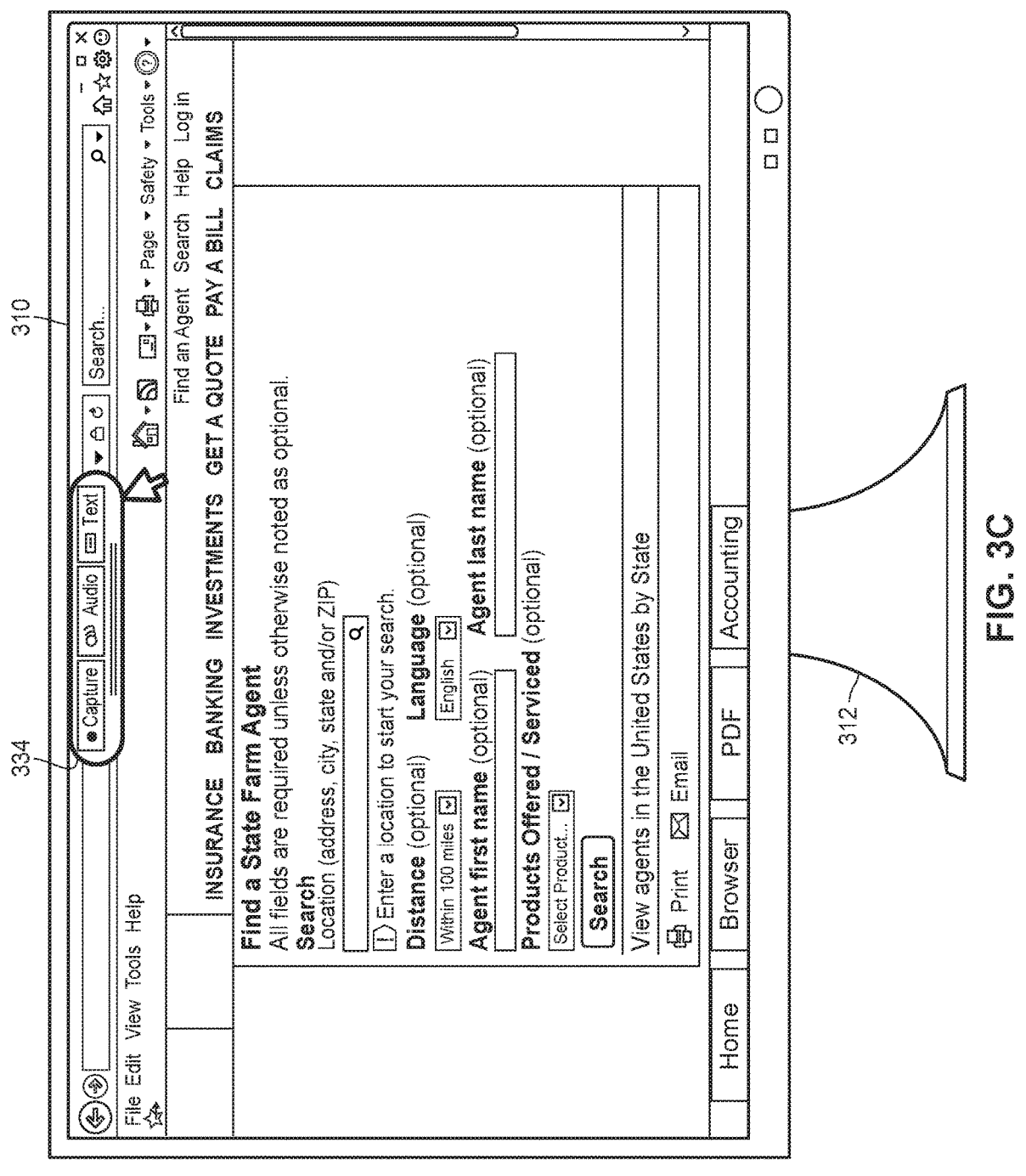

FIG. 3C depicts another example graphical user interface 334 displayed by the display screen 310. The event capture application may cause the graphical user interface 334 to be displayed, for example, in response to user activation of a control included in the graphical user interface 322 of FIG. 3B. The user activation may be, for example, a mouse click or tap of any portion of the graphical user interface 322, or on a specific control of the graphical user interface 322, etc. Additionally or alternatively, in cases in which the graphical user interface 322 is continuously displayed by the display screen 310, the user activation of the graphical user interface 322 may be a mouse hover over any portion (or a specific control) of the graphical user interface 322. In any case, a user activation of the graphical user interface 322 of FIG. 3B may be indicative that the user of the client device 312 has encountered a technical event.

Still other methods of causing the graphical user interface 334 to be displayed may be possible. For example, in some embodiments, the event capture application may cause the graphical user interface 334 to be displayed upon automatic detection of a technical event by the client device 312 (e.g., based upon monitoring of system state information and/or based upon communications received from other computing entities in the organization).

In any case, the graphical user interface 334 of FIG. 3C is generally similar to the graphical user interface 322 of FIG. 3B, with expanded interactive controls for (1) automatically obtaining system state information ("Capture"), (2) obtaining audio input from the user ("Audio"), and (3) obtaining text input from the user ("Text"). A user activation of the "Capture" control (e.g., via a user interaction such as a mouse click, touchscreen tap, etc.) may cause the event capture application to automatically obtain system state information associated with the client device 312 (e.g., by retrieving system state information monitored in the background, and/or by obtaining additional system state information). Activation of the "Audio" control may cause activation of a microphone of the client device 312 and/or display of one or more additional graphical user interfaces, such that the client device user may provide a spoken description of a technical event and/or an organizational idea. Similarly, activation of the "Text" control may cause display of one or more additional graphical user interfaces to allow the user to provide a written description of the technical event or organizational idea. Examples of such interfaces corresponding to the "Audio" and "Text" controls will be described with respect to FIGS. 3E and 3F, respectively.

Figure 3D:
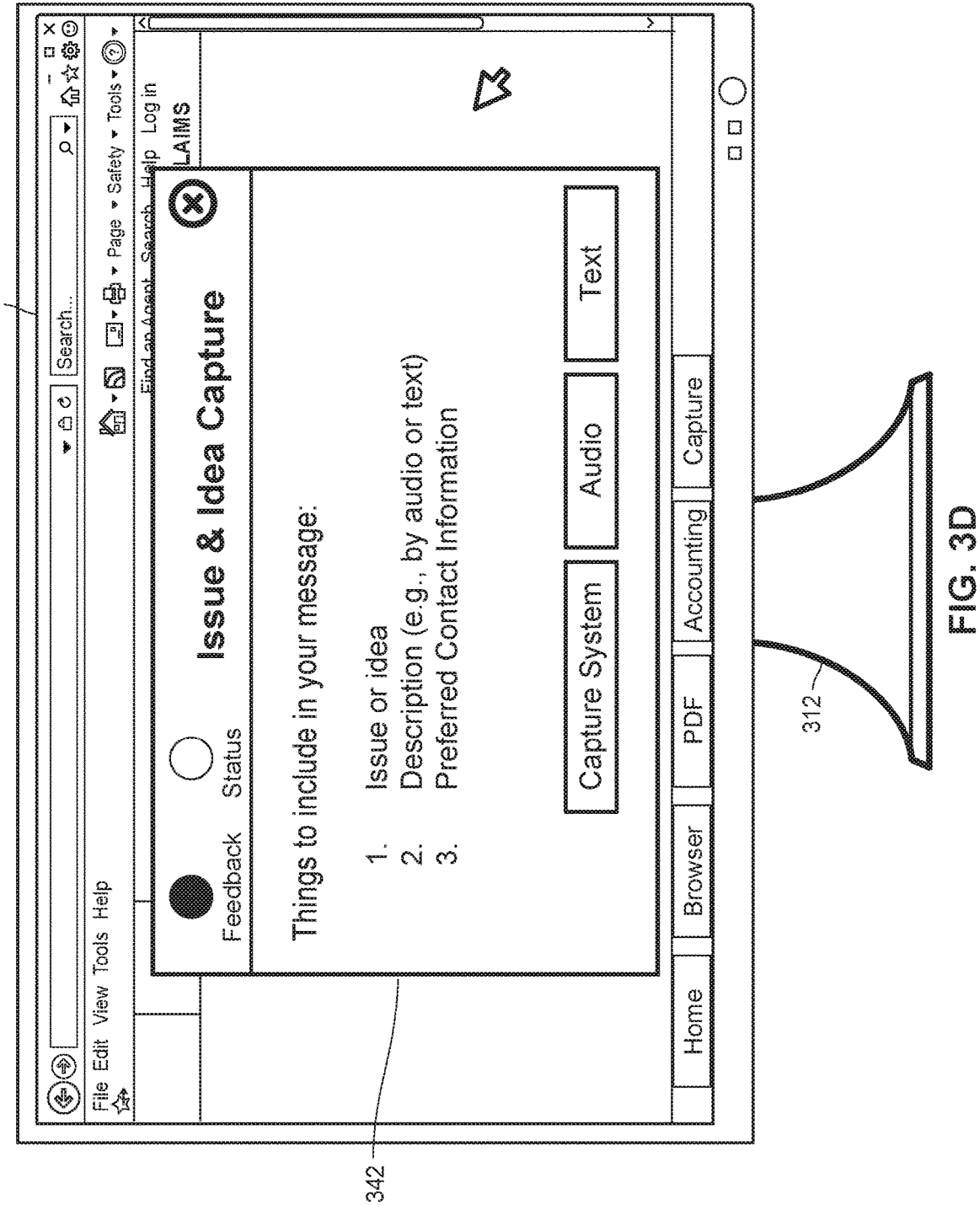

FIG. 3D illustrates another example graphical user interface 342 displayed by the display screen 310. In some embodiments, the event capture application may cause the graphical user interface 342 to be displayed in response to user activation of one or more controls in the graphical user interface 334 of FIG. 3C. Alternatively, in some embodiments, the event capture application may cause the graphical user interface 342 to be displayed in response to user activation of a control in the graphical user interface 322 of FIG. 3B (e.g., a mouse click or tap of the graphical user interface 322). That is, in some embodiments, the graphical user interface 342 of FIG. 3D may be displayed based upon user interaction with the user interface 322 of FIG. 3D, without interaction with the graphical user interface 334 of FIG. 3C.

The graphical user interface 342 of FIG. 3D includes controls similar to those in the graphical user interface 334 of FIG. 3C, which the user may activate to cause automatic collection of system state information based upon a technical event ("issue"), to provide audio relating to a technical event or organizational idea ("idea"), and/or to provide text relating to a technical event or organizational idea. When the graphical user interface 342 is active, an application tab ("Capture") appears along the other application tabs in the task bar of the client device 312, such that the user can easily access the graphical user interface 342 while the user is actively using the event capture application.

Figure 3E:
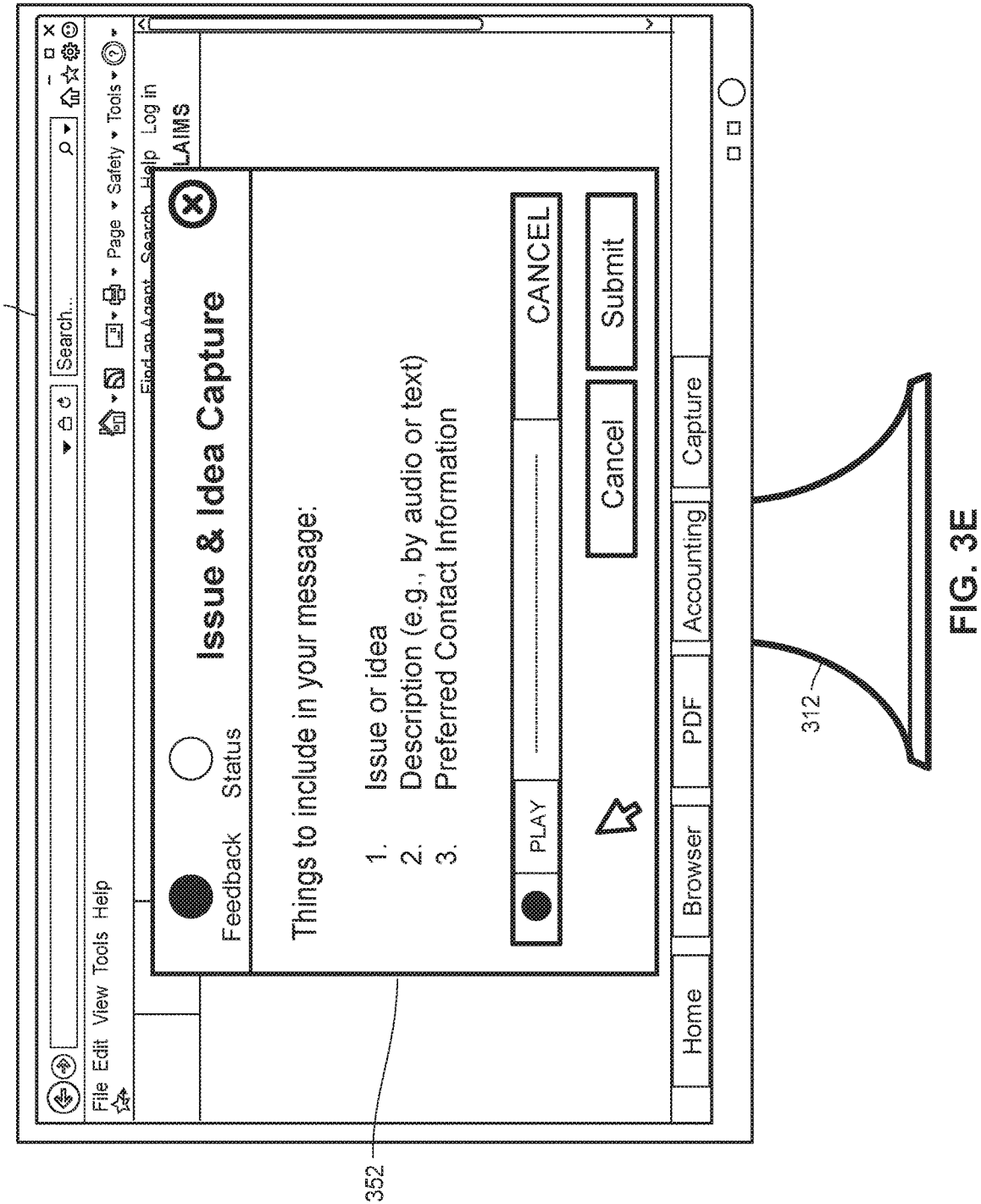

FIG. 3E depicts yet another example graphical user interface 352 displayed by the display screen 310, where the graphical user interface 352 facilitates recording, playback, and submission of user-provided audio describing a technical event or organizational idea. The event capture application may cause the graphical user interface 352 to be displayed, for example, in response to user activation of the "Audio" control of FIG. 3C and/or FIG. 3D.

In any case, using the graphical user interface 352, the user may describe the technical event as experienced at the client device 312, or the organizational idea. In the case of a technical event, the user may describe, for example, what activities the user was performing at or leading up to the time at which the user noticed the technical event, or how the occurrence of the technical event inhibited use of certain software and/or hardware of the client device 312. Such information may be particularly useful to facilitate diagnosis and resolution of a software or hardware malfunction that originated at the client device 312, or that otherwise affected the client device 312.

FIG. 3F depicts still another example graphical user interface 362 displayed by the display screen 310, where the graphical user interface 362 facilitates user submission of text describing a technical event or organizational idea. The event capture application may cause the graphical user interface 362 to be displayed, for example, in response to user activation of the "Text" control of FIG. 3C and/or FIG. 3D. As still another alternative, the event capture application may cause the graphical user interface 362 to be displayed in response to completion of recording of audio as shown in FIG. 3E (e.g., as indicated by user activation of the "Submit" control in FIG. 3E).

Still referring to FIG. 3F, text information included in the description of the technical event or organizational idea may be similar to that described above with respect to audio in FIG. 3E, for example. The user may additionally or alternatively use the graphical user interface 362 to provide preferred contact information of the user which, in some embodiments, the event capture application can use to provide further updates to the user regarding handling of the reported technical event or idea (e.g., updates regarding diagnosis of a cause of, or remedial actions for, a technical event).

In at least some embodiments, upon detection of a technical event (e.g., via user activation of controls of FIGS. 3B and/or 3C), the event capture application may automatically obtain system state information associated with the client device 312, without necessarily requiring that the user immediately provide any available audio, text, or other contextual information. That is, the user may cause system state information to be captured, and may later return to the event capture application to provide contextual information at a later, more convenient time. It is understood that "obtaining" or "capturing" system state information, or causing such information to be obtained or captured, may refer to triggering the recording of the information, or to saving information that is already being recorded in a rolling window manner (as discussed above).

In any case, upon obtaining system state information and/or further contextual information, the event capture application may cause the obtained information relating to the technical event or idea to be transmitted to one or more other computing entities (e.g., the "back-end" servers and/or workstations described with respect to FIG. 1).

Figure 3G:
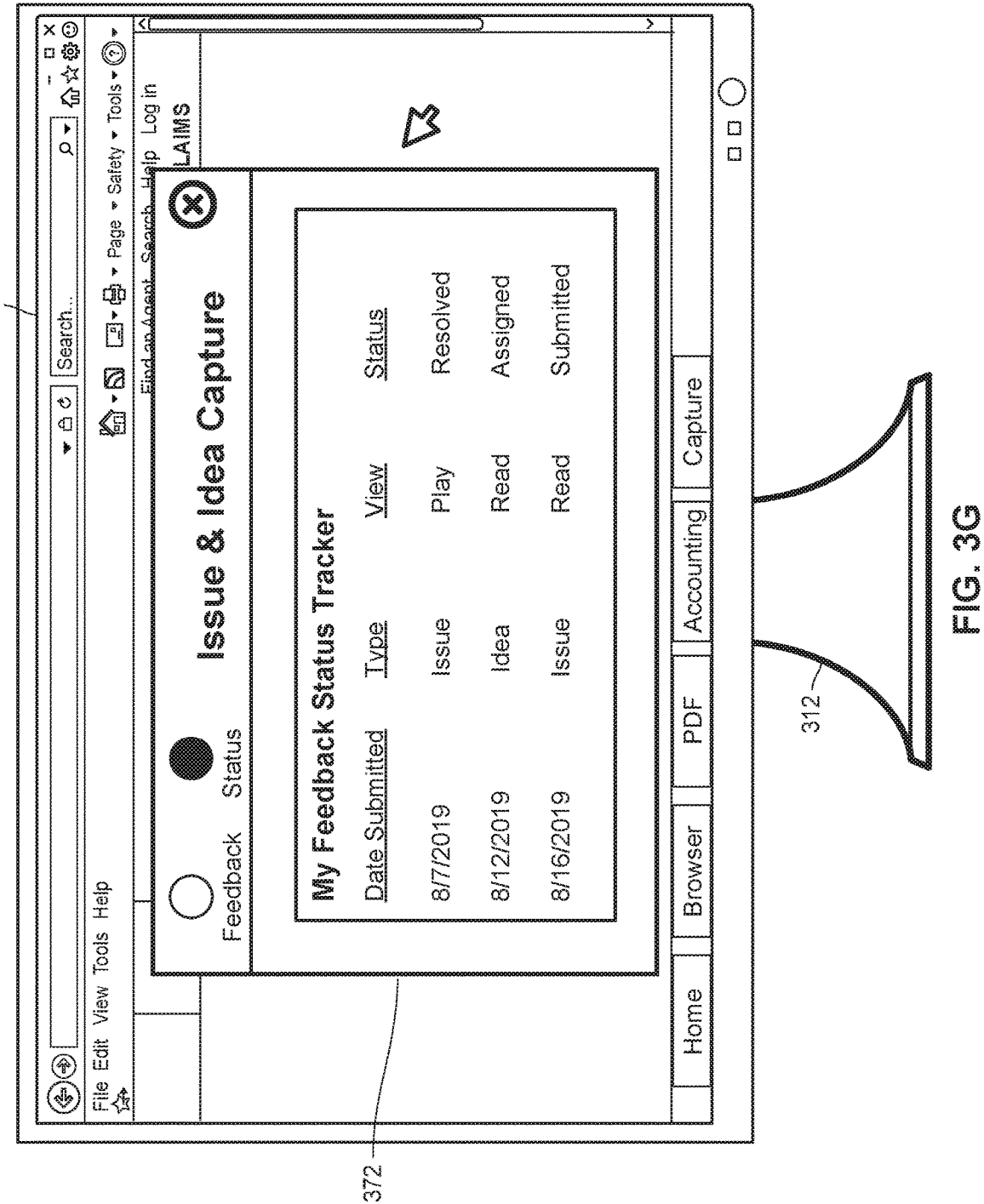

FIG. 3G depicts another example graphical user interface 372 displayed by the display screen 310, where the graphical user interface 372 facilitates the client device user's viewing of information related to technical events, and/or organizational ideas, previously reported via the user. For each event, the user may, for example, view the submission date, the type of event, the actual information submitted (e.g., "Play" submitted audio/video or "Read" submitted text), and/or a status of the submitted event (e.g., indicating whether back-end computing entities or staff have diagnosed or resolved a technical event or taken action on an organizational idea submitted by the user). In some embodiments, the graphical user interface 372 may facilitate viewing of additional information associated with a technical event (e.g., more detailed information identifying a diagnosed technical event, and/or instructions for resolving a root cause of the technical event). Furthermore, in some embodiments, the graphical user interface 372 may facilitate the addition or editing of previously provided contextual information (e.g., adding audio and/or text after initial submission of the event information). This functionality may be particularly useful if, for example, the client device user is not able to provide contextual information until a time substantially after the detection of a technical event and after the collection and transmission of system state information.

Various other user interfaces of the event capture application may be envisioned. Particularly, modifications to the user interfaces described above may be made to suit other input and/or display devices of the client devices 312. For example, audio interfaces may receive user audio input and/or play audio output to perform the functionalities described above via audio interactions instead of visual interactions. As another example, if the client device user has opted-in recording of video by a camera of the client device 312, the event capture application may cause one or more user interfaces to be displayed, via which the user can record, play back, and submit video of the user while he or she describes the technical event or organizational idea. Additionally or alternatively, in some embodiments, the event capture application may provide functionalities for capturing screenshots of the display screen 310 upon detection of technical events (e.g., if the client device user has opted-in to automatic screen capturing).

Via the techniques described above, the event capture application facilitates simple and intuitive acquisition of information relating to a technical event or organizational idea associated with the client device 312 and/or user thereof. Through reporting of the system state information and/or corresponding contextual information to various back-end computing entities and staff, the event capture application may facilitate identification and resolution of technical events emerging from various areas of an organizational computing system, as well as facilitate effective capturing and elevation of organizational ideas raised by users within the organization. Moreover, through operation of the event capture application in the background at the client device 312, the event capture application may reduce consumption of processing power and memory of the client device 312 (e.g., by avoiding generation and display of user interfaces that may consume processing resources and/or RAM). Additionally, the operation of the event capture application in the background may increase user interface capability at the client device 312 (e.g., due to user interface "real estate" not being occupied by event capture interfaces), while still keeping the event capture application easily accessible when required.

Example Information Obtained by Event Capture Application

Figure 4A:
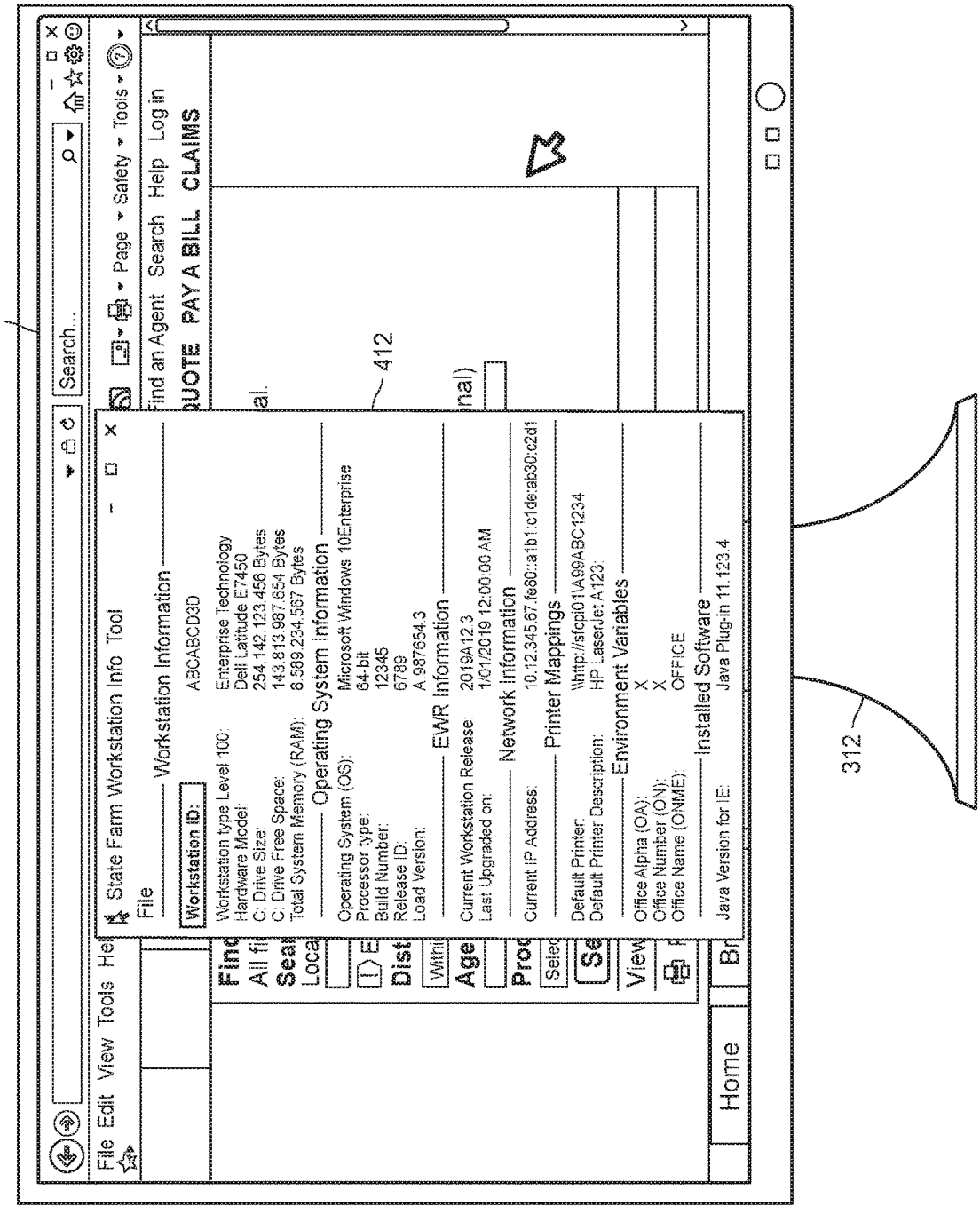
FIGS. 4A and 4B illustrate graphical user interfaces showing example system state information obtained by the event capture application, in accordance with some embodiments.
Figure 4B:
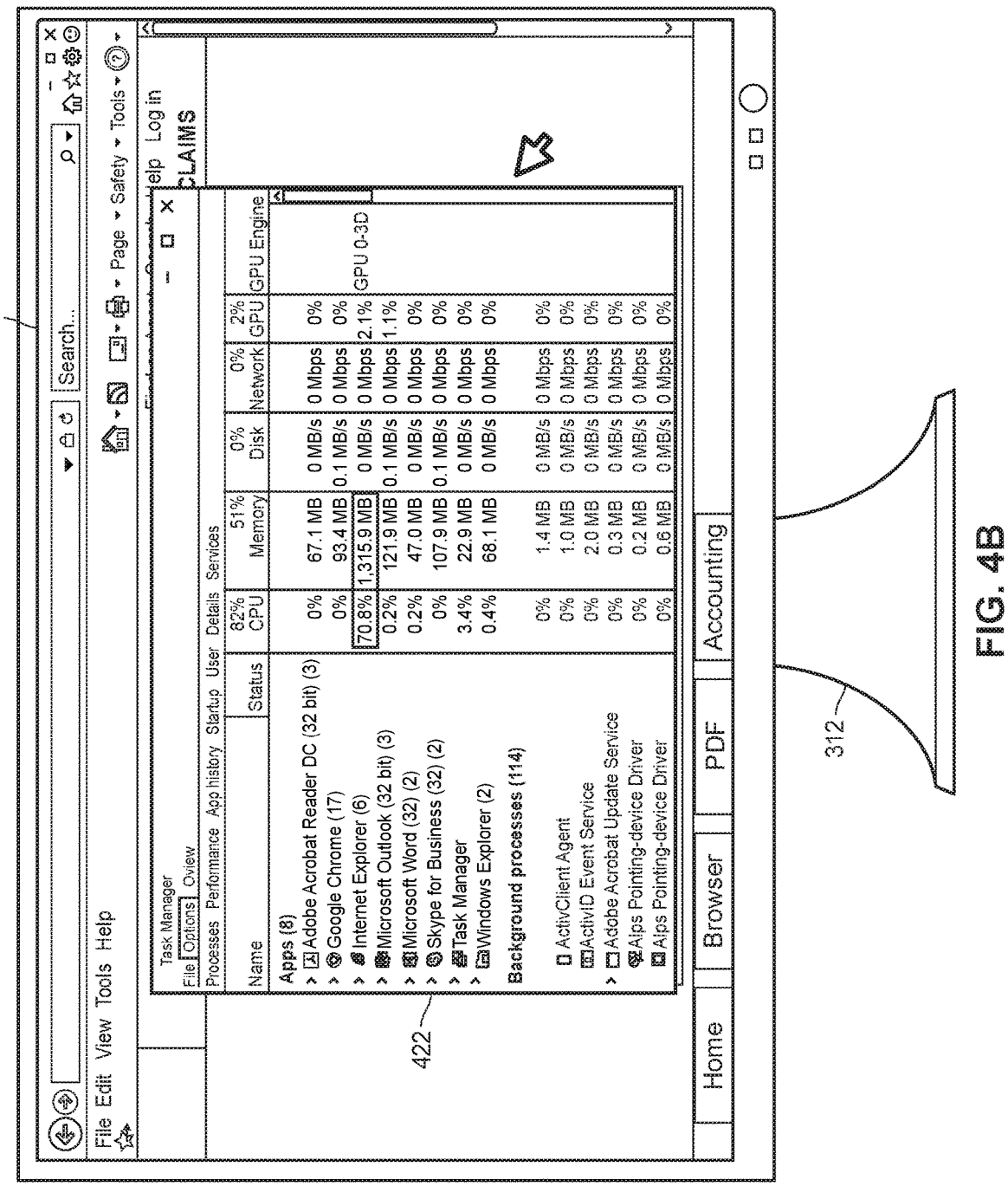

FIGS. 4A and 4B illustrate additional graphical user interfaces 412 and 422, respectively, which may be displayed by the display screen 310 of the client device 312, and which provide examples of system state information that may be obtained by the event capture application, in accordance with various embodiments. Either or both of the graphical user interfaces 412 and/or 422 may, in some embodiments, be accessible by the event capture application as described herein.

Obtained system state information associated with a client device may include various information directly pertaining to the client device 312 itself. Such client device information may include, for example, system date and time, memory usage information (e.g., RAM, ROM, and/or portable memory device usage or capacity), processor usage information (e.g., CPU usage, GPU usage, etc.), operating system information (e.g., OS version, installation date, OS updates, etc.), IP or other network addressing information, information regarding connected peripheral devices (e.g., connected I/O devices, printers, etc.), I/O usage information, and/or application usage information (e.g., usage of processing power or memory by applications, queries made and responses received by applications, etc.). System state information associated with the client device may also include information indicative of communications of the client device 312 over one or more networks (e.g., downloads and/or upload activity, network throughput, sources/destinations of network transmissions, response times from one or more servers, etc.).

System state information associated with a client device may additionally or alternatively include information pertaining specifically to a user of the client device 312. The system state information may include, for example, user account information, user login session information, historical application usage information, user system preferences or application preferences (e.g., settings for applications automatically launched upon client device startup), and/or other information made available by consent of the user of the client device 312. Still further, system state information associated with the client device 312 may include information associated with a physical environment in which the client device 312 operates (e.g., temperature, humidity, and/or power usage in the environment).

In some embodiments, system state information associated with the client device 312 may include information indicative of operations of other computing entities in an organizational computing system in which the client device operates. Such other computing entities may include, for example, one or more routers, modems, firewalls, servers, and/or other suitable computing entities including those described herein. As just one example, a detected technical event may relate to a particular software application served by one or more application servers within the organization. Accordingly, a particular back-end server communicating with the client device 312 to capture the event may also communicate with the application server(s) to obtain state information of the application server(s). This remote or "non-client" system state information may correspond to operation of the server and the particular software application at the time at which the technical event was detected, before the time of detection, and/or after the time of detection. In various embodiments, similar techniques may be implemented with respect to obtaining system state information associated with particular routers, modems, firewalls, other client devices, etc.

Various other system state information may also, or instead, be obtained via the event capture application, in accordance with the systems and methods described herein.

Example Computer-Implemented Methods

FIG. 5 illustrates a flow diagram of an example computer-implemented method 500 for acquiring information related to a technical event associated with a client electronic computing device ("client device"). The technical event may include, for example, a software application malfunction or a hardware malfunction originating at the client device, or otherwise affecting the client device (e.g., originating at or caused by another computing entity with which the client device communicates). Additionally or alternatively, the technical event may include a performance inefficiency of a software application or hardware component, the inefficiency being detectable by the client device user (e.g., excessive times to send or receive communications with other computing entities, long times to load web pages, etc.).

The method 500 may be implemented, for example, by a client device as described with respect to FIGS. 1, 2, and/or 3A-3G (e.g., by the client device 112, 212, and/or 312). More particularly, the method 500 may be performed by one or more processors of a client device executing an event capture application, as described herein. The event capture application may include non-transitory computer-executable instructions that are stored by one or more non-transitory computer-readable media of the client device, and are executable by the one or more processors. In various embodiments, the method 500 may involve user interactions with one or more graphical user interfaces and/or other user interfaces of the client device (e.g., interfaces descried with respect to FIGS. 3A-3G and/or 4A-4B).

The example method 500 includes detecting a user activation of a control presented on a user interface of the client computing device (502), e.g., a graphical user interface as depicted in FIG. 3B or 3C. For example, the user activation may include any one or more of (1) activation of the graphical user interface 322 of FIG. 3B, (2) activation of the "Capture" control in the graphical user interface 334 of FIG. 3C, and/or (3) activation of the "Capture System" control in the graphical user interface 342 of FIG. 3D. In any case, the user activation of the control may indicate an occurrence of a technical event associated with the client device (e.g., based upon a software and/or hardware issue as experienced by a user of the client device).

In some embodiments, the event capture application be configured to operate in the background at the client device prior to the detecting of the user activation of the control (e.g., as described with respect to FIGS. 3A-3C). The event capture application may, for example, be configured to continually obtain and temporarily store a rolling window of system state information, which may correspond to one minute, five minutes, fifteen minutes, thirty minutes, sixty minutes, or another suitable duration of time prior to any given current time.

The method 500 may also include, in response to detecting the user activation of the control, automatically obtaining system state information associated with the client computing device (504). System state information associated with the client device may include, for example, information indicative of operations of the client device itself, characteristics of an environment in which the client device is located, information indicative of other computing entities of the organizational computing system, and/or other suitable system state information, including any of the system state information described herein.

In embodiments in which the event capture application operates in the background prior to the detecting of the user activation, the automatically obtained system state information may include at least a portion of the system state information that was obtained prior to the detecting of the user activation. In some embodiments, the system state information includes information for some predetermined length of time after detecting the user activation (e.g., one minute, five minutes, etc.).

In some embodiments, the method 500 may further include, subsequent to the detecting of the user activation, obtaining further contextual information provided by the user describing the technical event (e.g., via audio, text, and/or other user interfaces such as those described with respect to FIGS. 3C-3G).

The method 500 may further include causing information relating to the technical event to be transmitted to one or more other computing entities (506), where the information associated with the technical event includes the obtained system state information (e.g., to one or more "back-end" servers 120 and/or 124 as depicted in FIG. 1). Transmitted information associated with the technical event may include at least a portion of the obtained system state information, at least a portion of the user-provided contextual information, and/or other relevant information associated with the technical event.

Transmission of the information relating to the technical event may facilitate a variety of further functionalities for handling of the technical event by the one or more other computing entities. The one or more other computing entities may, for example, categorize the technical event, assign a prioritization level to the technical event, route the information relating to the technical event (e.g., to other ones of servers 120 and/or 124), automatically diagnose the technical event, perform sentiment analysis of user-provided contextual information, and/or provide an updated status of a diagnosis and/or resolution of the technical event to the client device (e.g., as shown in FIG. 3G).

The method 500 may include additional, fewer, and/or alternate actions, in various embodiments.

FIG. 6 illustrates a flow diagram of an example computer-implemented method 600 for capturing an organizational idea conceived of by a client device user in an organization.

The method 600 may be implemented, for example, by a client device as described with respect to FIGS. 1, 2, and/or 3A-3G (e.g., by the client device 112, 212, and/or 312). More particularly, the method 600 may be performed by one or more processors of the client device executing an event capture application, as described herein. The event capture application may include non-transitory computer-executable instructions that are stored by one or more non-transitory computer-readable media of the client device, and are executable by the one or more processors. In various embodiments, the method 600 may involve user interactions with one or more graphical user interfaces and/or other user interfaces of the client device (e.g., interfaces descried with respect to FIGS. 3A-3G and/or 4A-4B).

The method 600 may include detecting a user activation of a control presented on a user interface (602), the user activation of the control indicating that the user of the client device intends to share an organizational idea. The graphical user interface may be similar to the graphical user interface depicted in FIG. 3B or 3C, for example. The organizational idea may, for example, relate to an improvement to software, hardware, and/or business processes utilized by the organization.

The method 600 may further include receiving, via user interactions with one or more user interfaces of the client device, information relating to the organizational idea (604), e.g., via graphical user interfaces described with respect to FIGS. 3C-3G. The user may, for example, provide audio, text, and/or video describing the organizational idea.

The method 600 may further include causing the information relating to the organizational idea to be transmitted to one or more other computing entities (606), such as one or more "back-end" servers 134 as depicted in FIG. 1.

Transmission of the information associated with the organizational idea may facilitate a variety of further functionalities for handling of the organizational idea via the one or more other computing entities. The one or more other computing entities may, for example, categorize the organizational idea, assign a prioritization level to the organizational idea, route information relating to the organizational idea to other back-end computing entities, and/or provide an update of the status of the organizational idea to the client device (e.g., as shown in FIG. 3G).

The method 600 may include additional, fewer, and/or alternate actions, in various embodiments.

ADDITIONAL CONSIDERATIONS

Although the preceding text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the one or more processors or processor-implemented modules may be located in a single geographical location (e.g., within a home environment, an office environment, or a server farm). In other example embodiments, the one or more processors or processor-implemented modules may be distributed across a number of geographical locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the terms "coupled," "connected," "communicatively connected," or "communicatively coupled," along with their derivatives. These terms may refer to a direct physical connection or to an indirect (physical or communication) connection. For example, some embodiments may be described using the term "coupled" to indicate that two or more elements are in direct physical or electrical contact. The term "coupled," however, may also mean that two or more elements are not in direct contact with each other, but yet still co-operate or interact with each other. Unless expressly stated or required by the context of their use, the embodiments are not limited to direct connection.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless the context clearly indicates otherwise.

Upon reading this disclosure, those of skill in the art will appreciate still additional alternative structural and functional designs for systems and methods through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

Finally, the patent claims at the end of this patent application are not intended to be construed under 35 U.S.C. § 112(f), unless traditional means-plus-function language is expressly recited, such as "means for" or "step for" language being explicitly recited in the claims. The systems and methods described herein are directed to an improvement to computer functionality, and improve the functioning of conventional computers.

What is claimed:

1. A computer-implemented method for acquiring information relating to a technical event associated with a client computing device, the method comprising:
   continuously displaying, by an event capture application being executed by one or more processors of the client computing device, a first graphical user interface while (i) a plurality of other applications operate at the client computing device and (ii) the event capture application operates as a background application to continuously monitor system state information comprising information pertaining to operation of the plurality of other applications in a time window of a predetermined duration prior to a current time;
   while continuously displaying the first graphical user interface, detecting, by the event capture application, a user activation of a control presented on the first graphical user interface, the user activation of the control indicating an occurrence of a technical event associated with the client computing device;
   automatically obtaining, by the event capture application and in response to detecting the user activation, at least a portion of the continuously monitored system state information;
   displaying, in response to detecting the user activation, a second graphical user interface of the event capture application at the client computing device, the second graphical user interface (i) occupying a greater screen area of the client computing device than the first graphical user interface, and (ii) being configured to receive further contextual information from the user regarding the technical event; and
   causing, by the event capture application, information relating to the technical event to be transmitted to one or more other computing entities, the information associated with the technical event including at least the obtained system state information.

2. The computer-implemented method of claim 1, wherein the technical event comprises a software application malfunction or a hardware malfunction originating at, or otherwise affecting the performance of, the client computing device.

3. The computer-implemented method of claim 1, wherein the one or more other computing entities comprise one or more servers configured to at least one of (1) route the transmitted information relating to the technical event, (2) prioritize or categorize the technical event, or (3) diagnose a hardware or software malfunction associated with the technical event.

4. The computer-implemented method of claim 1, further comprising:
   subsequent to detecting the user activation of the control, obtaining, by the second graphical user interface of the event capture application, the further contextual information associated with the technical event, the further contextual information provided via a user of the client computing device and one or more input devices of the client computing device,
   wherein causing the information relating to the technical event to be transmitted comprises causing at least a portion of the further contextual information to be transmitted to the one or more other computing entities.

5. The computer-implemented method of claim 4, wherein the further contextual information comprises an audio recording provided by the user via a microphone of the client computing device.

6. The computer-implemented method of claim 4, wherein the further contextual information comprises a text description of the technical event provided by the user via one of the one or more input devices of the client computing device.

7. The computer-implemented method of claim 1, further comprising, subsequent to causing the information relating to the technical event to be transmitted:
   receiving, by the one or more processors, an indication of an updated status associated with a diagnosis or resolution of the technical event made via the one or more other computing entities; and
   displaying, by the one or more processors, the updated status by another user interface of the client computing device.

8. A client computing device configured to acquire information relating to a technical event associated with the client computing device, the client computing device comprising:
   one or more processors; and
   one or more computer memories storing non-transitory computer executable instructions that, when executed by the one or more processors, cause the client computing device to:
      continuously display, by an event capture application being executed by the one or more processors, a first graphical user interface while (i) a plurality of other applications operate at the client computing device and (ii) the event capture application operates as a background application to continuously monitor system state information comprising information pertaining to operation of the plurality of other applications in a time window of a predetermined duration prior to a current time;
      while continuously displaying the first graphical user interface, detect, by the event capture application, a user activation of a control presented on the first graphical user interface, the user activation of the control indicating an occurrence of a technical event associated with the client computing device,
      automatically obtain, by the event capture application and in response to detecting the user activation, at least a portion of the continuously monitored system state information,
      in response to detecting the user activation, display a second graphical user interface of the event capture application at the client computing device, the second graphical user interface (i) occupying a greater screen area of the client computing device than the first graphical user interface, and (ii) being configured to receive further contextual information from the user regarding the technical event, and
      cause, by the event capture application, information relating to the technical event to be transmitted to one or more other computing entities, the information associated with the technical event including at least the obtained system state information.

9. The client computing device of claim 8, wherein the technical event comprises a software application malfunction or a hardware malfunction originating at, or otherwise affecting the performance of, the client computing device.

10. The client computing device of claim 8, wherein the one or more other computing entities comprise one or more servers configured to at least one of (1) route the transmitted information relating to the technical event, (2) prioritize or categorize the technical event, or (3) diagnose a hardware or software malfunction associated with the technical event.

11. The client computing device of claim 8, wherein the non-transitory computer executable instructions, when executed by the one or more processors, further cause the client computing device to:
   subsequent to the detecting of the user activation of the control, obtain, by the second graphical user interface of the event capture application, the further contextual information associated with the technical event, the further contextual information provided via a user of the client computing device and one or more input devices of the client computing device,
   wherein the causing of the information relating to the technical event to be transmitted comprises causing at least a portion of the further contextual information to be transmitted to the one or more other computing entities.

12. The client computing device of claim 11, wherein the contextual information comprises an audio recording provided by the user via a microphone of the client computing device.

13. The client computing device of claim 11, wherein the further contextual information comprises a text description of the technical event provided by the user via one of the one or more input devices of the client computing device.

14. The client computing device of claim 8, wherein the non-transitory computer executable instructions, when executed by the one or more processors, further cause the client computing device to, subsequent to transmitting the information associated with the technical event:
   receive an indication of an updated status associated with a diagnosis or resolution of the technical event made via the one or more other computing entities; and
   display the updated status by another user interface of the client computing device.

15. One or more non-transitory computer readable media storing non-transitory computer executable instructions that, when executed by one or more processors, cause a client computing device to:
   continuously display, by an event capture application being executed by the one or more processors, a first graphical user interface while (i) a plurality of other applications operate at the client computing device and (ii) the event capture application operates as a background application to continuously monitor system state information comprising information pertaining to operation of the plurality of other applications in a time window of a predetermined duration prior to a current time;
   while continuously displaying the first graphical user interface, detect, by the event capture application, a user activation of a control presented on the first graphical user interface, the user activation of the control indicating an occurrence of a technical event associated with the client computing device;
   automatically obtain, by the event capture application and in response to detecting the user activation, at least a portion of the continuously monitored system state information;
   in response to detecting the user activation, display a second graphical user interface of the event capture application at the client computing device, the second graphical user interface (i) occupying a greater screen area of the client computing device than the first graphical user interface, and (ii) being configured to receive further contextual information from the user regarding the technical event, and
   cause, by the event capture application, information relating to the technical event to be transmitted to one or more other computing entities, the information associated with the technical event including the obtained system state information.

16. The one or more non-transitory computer-readable media of claim 15, wherein the technical event comprises a software application malfunction or a hardware malfunction originating at, or otherwise affecting the performance of, the client computing device.

17. The one or more non-transitory computer-readable media of claim 15, wherein the non-transitory computer executable instructions, when executed by the one or more processors, further cause the client computing device to:
   subsequent to the detecting of the user activation of the control, obtain, by the second graphical user interface of the event capture application, the further contextual information associated with the technical event, the further contextual information provided via a user of the client computing device and one or more input devices of the client computing device,
   wherein the causing of the information relating to the technical event to be transmitted comprises causing at least a portion of the further contextual information to be transmitted to the one or more other computing entities.

* * * * *